United States Patent
Herrmann (10) Patent No.: US 9,746,566 B2
(45) Date of Patent: Aug. 29, 2017

(54) METHOD AND APPARATUS FOR IMAGE CORRECTION OF X-RAY IMAGE INFORMATION

(71) Applicant: KONINKLIJKE PHILIPS N.V., Eindhoven (NL)

(72) Inventor: Christoph Herrmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/647,139

(22) PCT Filed: Sep. 29, 2013

(86) PCT No.: PCT/IB2013/058973
§ 371 (c)(1),
(2) Date: May 26, 2015

(87) PCT Pub. No.: WO2014/087264
PCT Pub. Date: Jun. 12, 2014

(65) Prior Publication Data
US 2015/0316663 A1 Nov. 5, 2015

Related U.S. Application Data

(60) Provisional application No. 61/733,016, filed on Dec. 4, 2012.

(51) Int. Cl.
*G01T 1/24* (2006.01)
(52) U.S. Cl.
CPC .................. *G01T 1/247* (2013.01)
(58) Field of Classification Search
None
See application file for complete search history.

(56) References Cited

U.S. PATENT DOCUMENTS

| 5,506,880 A | 4/1996 | Scardino et al. |
| 6,362,482 B1 | 3/2002 | Stettner et al. |

(Continued)

FOREIGN PATENT DOCUMENTS

| WO | 2007010448 A2 | 1/2007 |
| WO | 2011077302 A2 | 6/2011 |

OTHER PUBLICATIONS

El-Hanany, U., et al.; CZT pixel-detectors equipped with effective Ohmic contact; their spectroscopic performance and the enigma of why they thus behave; 1999; SPIE Conf. on Hard X-Ray, Gamma-Ray, and Neutron Detector Physics; vol. 3768; pp. 2-14.

(Continued)

*Primary Examiner* — Tsung-Yin Tsai (57) ABSTRACT

The present invention relates to the correction of X-ray image information, e.g. the correction of X-ray image information regarding persistent currents in X-ray detector elements. X-ray detectors may be embodied as photoconductors with ohmic contacts, which output a photo current depending on the energy and amount of photons impinging on a respective photoconductor pixel. Such photoconductors may exhibit a photoconductive gain, i.e. the measured current when irradiated by X-ray is higher than the current, which would result from impinging photons only generating electron-hole pairs. To compensate for photoconductive gain a method (50) for image correction of X-ray image information is provided, comprising receiving (52) readout information of an X-ray detector element (14), wherein the readout information is dependent on impinging X-radiation (20) generating a photo current and compensating (54) the readout information for a photoconductive gain employing compensation information.

9 Claims, 5 Drawing Sheets

(56) References Cited

U.S. PATENT DOCUMENTS

| | | | |
|---|---|---|---|
| 6,759,658 | B2 | 7/2004 | Overdick et al. |
| 6,797,960 | B1 | 9/2004 | Spartiotis et al. |
| 7,873,144 | B2 | 1/2011 | Luhta et al. |
| 8,866,094 | B2 | 10/2014 | Tsukiyama et al. |
| 9,069,081 | B2 | 6/2015 | Campbell et al. |
| 9,176,238 | B2 | 11/2015 | Herrmann et al. |
| 2004/0027183 | A1 | 2/2004 | Binkley |
| 2004/0119855 | A1* | 6/2004 | Partain ............... H04N 5/361 348/243 |
| 2006/0043315 | A1 | 3/2006 | Cook et al. |
| 2008/0080665 | A1 | 4/2008 | Ikhlef et al. |
| 2009/0039397 | A1 | 2/2009 | Chao |
| 2009/0304149 | A1* | 12/2009 | Herrmann ............ A61B 6/4233 378/62 |
| 2012/0066895 | A1* | 3/2012 | Tsuda ............... G01R 33/3804 29/602.1 |
| 2014/0328464 | A1* | 11/2014 | Proksa ............... G01N 23/046 378/62 |
| 2015/0268362 | A1* | 9/2015 | Proksa ................ G01T 1/24 250/370.08 |

OTHER PUBLICATIONS

Franchi, R., et al.; Photon counting X-ray imaging with CdTe pixel detectors based on XPAD2 circuit; 2006; Nuclear Instruments and Methods in Physics Research; A563: 249-253.

* cited by examiner

METHOD AND APPARATUS FOR IMAGE CORRECTION OF X-RAY IMAGE INFORMATION

CROSS REFERENCE TO RELATED APPLICATIONS

This application is a national filing of PCT application Serial No. PCT/IB2013/058973, filed Sep. 29, 2013, published as WO 2014/087264 A1 on Jun. 12, 2014, which claims the benefit of U.S. provisional application Ser. No. 61/733,016 filed Dec. 4, 2012, which is incorporated herein by reference.

FIELD OF THE INVENTION

The present invention relates to X-ray imaging technology in general.

More particularly, the present invention relates to the correction of X-ray image information, e.g. the correction of X-ray image information regarding persistent currents in X-ray detector elements. In particular, the present invention relates to a method for image correction of X-ray image information, an apparatus for image correction of X-ray image information, an X-ray system comprising an apparatus according to the present invention, the use of such an apparatus in one of an X-ray system and a CT system, a computer-readable medium as well as program element.

BACKGROUND OF THE INVENTION

An object to be examined, e.g. a patient, of which an X-ray image is to be acquired, is regularly arranged between an X-ray generating device, e.g. an X-ray tube, and an X-ray detector element in the path of X-ray radiation. Said X-ray radiation is penetrating the object emanating from the X-ray generating device, subsequently arriving at the X-ray detector element. An inner structure or tissue structure of the object to be examined provides a spatial attenuation of the X-ray beam arriving at the X-ray detector after passage of the object. The X-ray radiation, spatially attenuated by the object, is subsequently detected by the X-ray detector. Said attenuation information is then employed for generating X-ray image information of the object.

For obtaining said X-ray image information, an X-ray detector element is registering a photon energy and/or a photon count of photons arriving at the detector. The photon energy generates a photo current in the detector element, in particular in each pixel element of a photodetector, which is substantially read out, i.e. provided as an output of the X-ray detector to subsequent electronics or circuitry for generating said image information.

X-ray detectors may be embodied as photoconductors with ohmic contacts which output a photo current depending on the energy and amount of photons impinging on a respective photoconductor element or X-ray detector pixel element. Such photoconductors with ohmic contacts may exhibit a photoconductive gain ii, i.e. the measured current of such an X-ray detector pixel when irradiated by X-radiation is higher, possibly much higher, than the current, which would result from impinging photons only generating electron-hole pairs. The current only generated by impinging photons, which may be optical, X-ray or other types, is referred to as photo current.

U.S. Pat. No. 6,759,658 B2 describes an X-ray detector having a large dynamic range, further describing a combination of a counting and integrating channel.

WO 2007/010448 A2 describes X-ray detector imaging with polychromatic spectra, further describing a combination of a counting channel with several energy thresholds and an integrating channel.

SUMMARY OF THE INVENTION

One aspect of the present patent application may thus be seen in compensating readout information of an X-ray detector element for a photoconductive gain or in other words for persistent currents.

Accordingly, a method for image correction of X-ray image information, an apparatus for image correction of X-ray image information, an X-ray system comprising an apparatus according to the present invention, the use of an apparatus according to the present invention, a computer-readable medium as well as a program element for image correction of X-ray image information according to the independent claims are provided. Preferred embodiments may be taken from the dependent claims.

The aforesaid also applies to direct conversion semiconductors like CdTe and CZT semiconductors employed as conversion material for X-ray detectors to count individual photons, in particular for computed tomography imaging. Accordingly, the method and apparatus of the present invention may in particular be employed with all imaging modalities, which use ionizing radiation and which employ a direct converter for converting said radiation to electrical signals.

The photoconductive gain exhibited in direct conversion semiconductors may be considered to be due to the presence of hole traps as well as the fact that the mobility of holes is about a factor of 10 smaller than the mobility of electrons. Adding to that, deep traps are more important than shallow traps.

When a photon, e.g. of X-radiation, interacts with material and generates a cloud of electron-hole pairs, the applied external electric field of e.g. 300 V/mm separates electrons and holes. Subsequently, the electrons drift towards the anode while the holes drift towards the cathode. Due to the difference in mobility, the electrons may be assumed to reach the anode faster than the "holes". In other words, when electrons reach the anode element of an X-ray detector pixel, it may be assumed that there are still holes in transition towards the cathode element. It may even be that all holes corresponding to the electrons are still in transition.

Further, due to hole traps in the semiconductor, the holes may be trapped, which adds to the time for them to reach the cathode thereby exceeding the time resulting from the hole mobility itself, seen in conjunction with the field strength.

Consequently, when the electrons have reached the anode, the bulk is no longer electrically neutral due to the presence of holes in the semiconductor, while the corresponding electrons are about to leave the same or already have left the same at the anode. This results, in a very simple model, in the injection of electrons at the cathode side to enforce electrical neutrality, in particular, if the cathode has good ohmic properties. In other words, as long as there are trapped holes or holes in transition towards the cathode, while the corresponding electrons already have reached the anode, electrons may be considered to be injected from the cathode into the bulk and subsequently move, forced by the applied electrical field, also towards the anode, resulting in an additional current. This additional current is referred to as persistent current.

This behavior may be summed up as the photoconductive gain being approximately proportional to the quotient of the "average lifetime of a hole until recombination" and the "transition time of an injected electron from the cathode to the anode". The photoconductive gain may therefore be a characteristic property of the considered crystal, in particular of the considered volume of the crystal.

The photoconductive gain may thus be the factor by which the measured current is actually larger than the current generated by the impinging photons themselves. Thus, the measured current which is observed per pixel element of an X-ray detector element is the sum of the photo current generated by impinging photons and the persistent current resulting from the above-described behavior of the semiconductor. The photoconductive gain $\eta$ may thus be calculated as follows $$\eta = 1 + \frac{\text{"persistent current"}}{\text{"photo current"}} \quad \text{Equation 1}$$

These and other aspects of the present invention will become apparent from and elucidated with reference to the embodiments described hereinafter.

Exemplary embodiments of the present invention will be described below with reference to the following drawings.

The illustration in the drawings is schematic. In different drawings, similar or identical elements are provided with similar or identical reference numerals.

The figures are not drawn to scale, however may depict qualitative proportions.

DETAILED DESCRIPTION OF EMBODIMENTS

In case direct conversion semiconductors like Cd[Zn]Te semiconductors with ohmic (cathode) contacts are employed for single photon counting detectors, the photoconductive gain may be considered to cause a major problem especially for direct-current (DC) coupled readout electronics. Since the persistent current may be considered to be a very slowly changing or rather constant current on top of the regular photo current generated by impinging photons, it may be considered to cause a baseline shift at the output of an analog readout channel towards the preset energy thresholds such that, without any correction means, the energies of impinging photons are registered wrongly.

In case the persistent current changes very slowly, approaches like baseline restoration may be applied. However, in particular for direct conversion semiconductors or Cd[Zn]Te-material engineered for X-ray imaging at high flux, there are indications that the persistent current may be considered to be "switched on" and "switched off" very quickly, without significantly changing while present, i.e. in case the incident X-ray spectrum and flux remains substantially constant. In other words, the persistent current may be considered to disappear very quickly, e.g. on a microsecond scale or less, after the X-ray irradiation has ceased.

Since the photoconductive gain may be considered a property of a particular volume within the direct conversion material, it is a characteristic of each pixel element, in particular in a direct conversion X-ray sensor made of CdTe or CdZnTe.

Accordingly, the present invention proposes to determine the photoconductive gain for each pixel of a direct conversion X-ray sensor element, i.e. while measuring in addition to the number of individual photons arriving in each measurement period also determining the current observed in each pixel. Subsequently, the photo current as well as the persistent current are determined or estimated from the measured total pixel current and the (known or predetermined) photoconductive gain of each pixel element. Subsequently, this information may be employed to correct the readout information for photoconductive gain. In other words, compensation information is employed for determining a compensated photo current from the measured current, thus removing the persistent current to allow an energy estimation of each arriving photon by compensating a baseline shift caused by the persistent current. A baseline shift in particular refers to a shift (to smaller energies) in detected energy level of a single photon.

The technical concept of the present invention thus provides the benefit that it may deal with persistent currents, which disappear on a microsecond timescale and which otherwise could not be corrected by using approaches like e.g. a baseline restorer, which senses the baseline and subsequently adjusts the baseline by providing a correcting current at the input node. This may be because a baseline restorer approach may be considered to work only for slowly changing persistent currents. Several different baseline restoration approaches are known, one implementation being as follows: The baseline restorer may sense the change in baseline at the output of the pulse shaping front-end and may subsequently inject a current at the input of the front-end to compensate for this baseline shift. Due to the fact that correctly sensing the baseline at the output requires the output waveform to actually reach the baseline, this feedback loop may be considered to be rather slow, as compared to the changes of the output waveform due to current pulses originating from X-ray photons.

The described concept may also allow for dealing with material behavior different from the described simple model, e.g. in case the persistent current may be considered to depend on the X-ray flux and the mean X-ray energy in a non-linear way, while the signal current may be considered to depend linearly on the flux and the mean X-ray energy. In such a case, the photoconductive gain may be measured for different mean energies of incident X-ray flux under different flux and mean energy photo current conditions. The results of said measurement may be compiled in a look-up table with the photoconductive gain being a function of the mean energy. Also the function itself may be employed for precisely determining a photoconductive gain.

The method for image correction according to the present invention employs the readout information of an X-ray detector element and compensates said readout information for photoconductive gain employing compensation information. In other words, compensation information is used to remove from the readout information that part that is attributed to the persistent current, i.e. the photoconductive gain. The readout information is dependent on impinging X-radiation, which generates a photo current in the X-ray detector element, in particular in each pixel independently.

According to the previously described theory, the photo current, which would only reflect the impinging X-radiation, is overlaid by the persistent current occurring in particular when using direct conversion semiconductors. After compensation of the readout information a compensated photo current, compensated for said persistent current, is obtained. With said compensated photo current, a detected energy level of a photon arriving at the X-ray detector element may be corrected as well. In other words, the persistent current may be considered to contribute to a photon energy determination, which does not reflect the actual photon energy but which determines an energy level that is higher than the actual photon energy. Consequently, when determining a photon energy without compensating for persistent current, the determined photon energy would be smaller than the actual energy of the photon arriving. When removing the influence of the persistent current from the photo current and thus obtaining a compensated photo current, said compensated photo current may be subsequently employed to determine a compensated photon energy, which more accurately reflects the actual energy of a particular photon arriving at the X-ray detector element.

Regularly, a photon energy is not necessarily determined by its particular precise value, rather a particular energy range is determined, in which energy range the photon energy of a received photon falls. In case the photo current is not compensated for persistent current, the subsequently determined threshold level of a photon energy may be estimated to be higher than the actual photon energy. Thus, when compensating the photo current for persistent current, either the value output to the threshold level determinators or discriminators is compensated for or the levels themselves are changed to reflect the photoconductive gain, i.e. the added photon energy determined, which is attributed to the persistent current.

The compensation information of the photoconductive gain may be determined, in particular for each pixel, by a calibration operation of the X-ray system. Said calibration operation may e.g. be an operation of the X-ray system without any object in the path of the X-radiation between the X-ray generating device and the X-ray detector employing a particular, known X-ray flux having a known mean energy. During said calibration operation, it is thus known, which energy level arriving at a particular pixel element is to be expected. Said expected value may subsequently be compared with the actual measured value. Deviations between the expected value and the measured value may thus be attributed to the persistent current and the photoconductive gain resulting therefrom. Said determined photoconductive gain, the persistent current per pixel respectively, may be employed for determining the compensation information so that a measured value, i.e. the obtained readout information, may be compensated for the photoconductive gain. Again, either the readout information may be compensated for prior to forwarding the readout information to subsequent readout electronics or the readout electronics themselves, in particular their determination behavior may be changed to remove the influence of the photoconductive gain for obtaining a compensated output value.

In case the compensation information is functionally dependent on the flux of X-radiation, e.g. in a substantially linear way, said function could be employed for determining the compensated information over a rather broad range of arriving flux. In case the photoconductive gain is non-linearly dependent upon the flux of X-radiation, a look-up table may be determined, comprising specific compensation information values for specific flux values. Preferably, a look-up table having only one value per detector pixel may be preferred as this could be interpreted as a linear dependency between the flux of X-radiation and the photoconductive gain, at least over a certain energy range.

In case the energy of a particular photon is determined by using a plurality of threshold values, the threshold values in turn may be compensated to reflect the changes that occur due to the persistent current, while determining an uncompensated energy level of a photon. Alternatively, the readout information corresponding to said energy level may be compensated for persistent current, which in turn would render it unnecessary to change the individual threshold values, since the compensated energy level again corresponds to the actual energy level of the photon, in particular the energy level that would be provided as readout information when considering photo current only without additional persistent current.

In case the readout information not only comprises the above-described fast changing persistent currents but also slowly changing persistent currents e.g. due to deep traps, which are released only very slowly said slowly changing persistent current components may be compensated in addition to the fast changing persistent current components by a so-called baseline restoration. A baseline restorer basically may be seen as a feedback loop, which removes the parts of the output of the X-ray detector pixel attributed to the slowly changing persistent currents.

Figure 1:
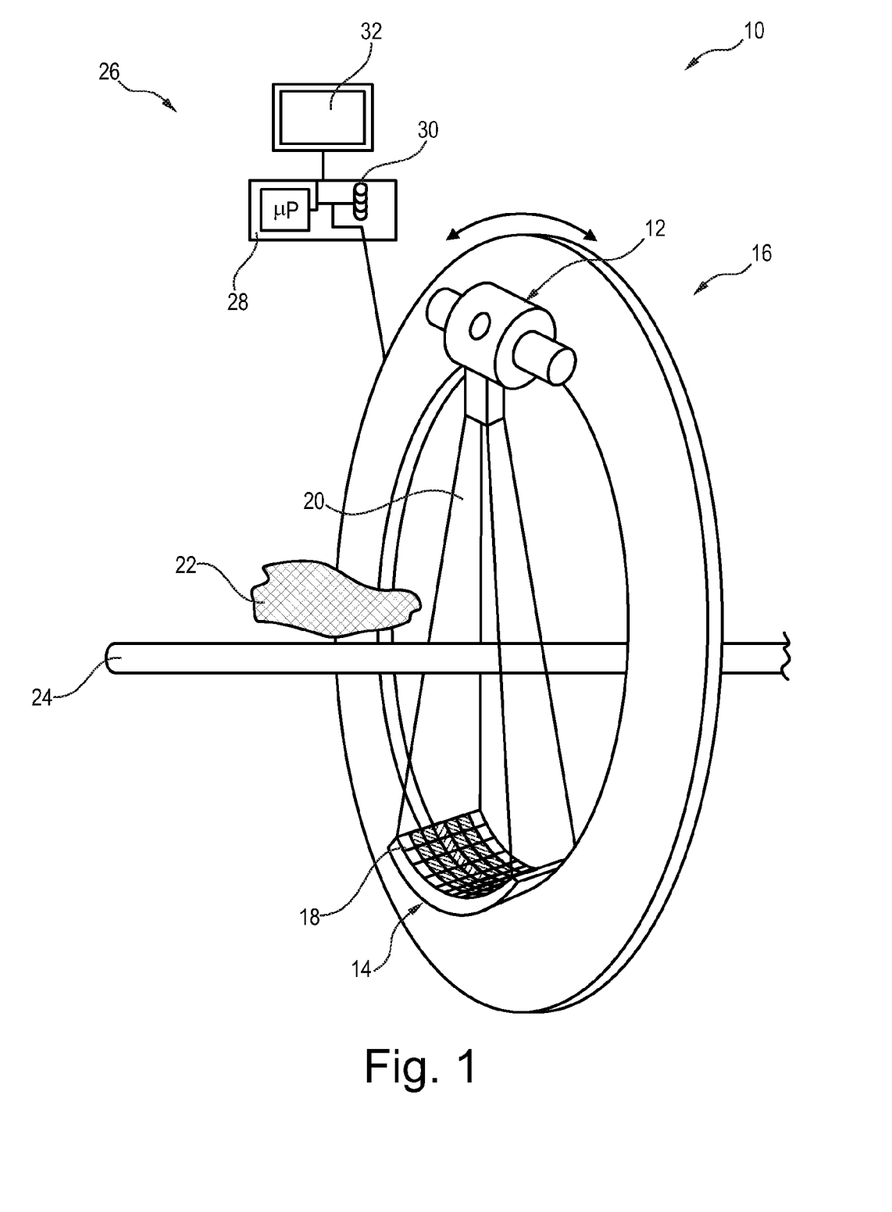
FIG. 1 an exemplary embodiment of a CT system according to the present invention.

Now referring to FIG. 1, an exemplary embodiment of a CT system according to the present invention is depicted.

CT system 100 comprises an X-ray generating device 12 or X-ray tube as well as an X-ray detector 14 arranged on opposing sides of a gantry 16. X-ray generating device 12 is generating X-radiation 20, in FIG. 1 exemplarily depicted as a cone-beam arriving at the two-dimensional X-ray detector 14. Individual X-ray detector pixel elements 18 are provided on the X-ray detector 14. On a support 24, an object 22 to be examined is arranged, which object 22 may be brought into the X-ray beam 20 for spatially attenuating said X-ray beam to obtain information about the inner structure of object 22. The X-ray generating device 12 and the X-ray detector 14 are rotating about the object 22 on gantry 16, thereby generating individual X-ray images of a plurality of angular views around the object, which can later be reconstructed into a three-dimensional structure, e.g. by an apparatus 26. Apparatus 26 comprises a processor 28 as well as a storage element 30 for storing data prior to and/or subsequent to processing operations of processor 28 conducted in conjunction with the image information acquired by the X-ray detector 14. A user of the X-ray/CT system 10 may be provided with visual information depicted on display element 32.

The method according to the present invention may be performed both either on live acquired images from system 10 as well as on stored pre-acquired image information, e.g. stored on storage element 30.

Figure 2:
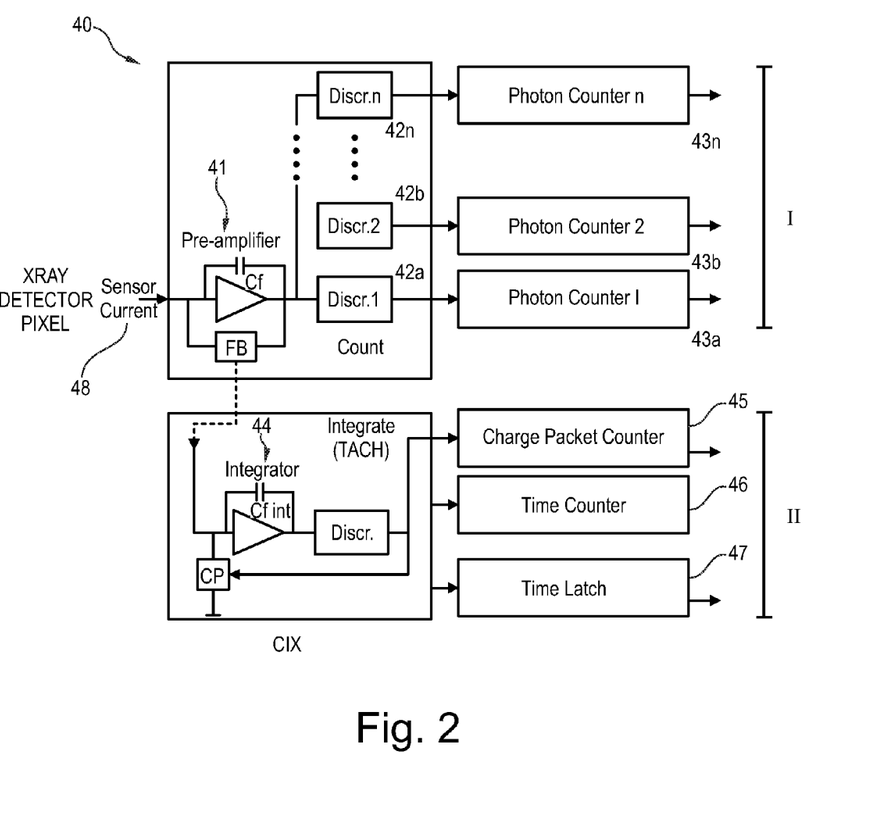
FIG. 2 an exemplary embodiment of electronics circuitry for analyzing readout information.
Figure 4A:
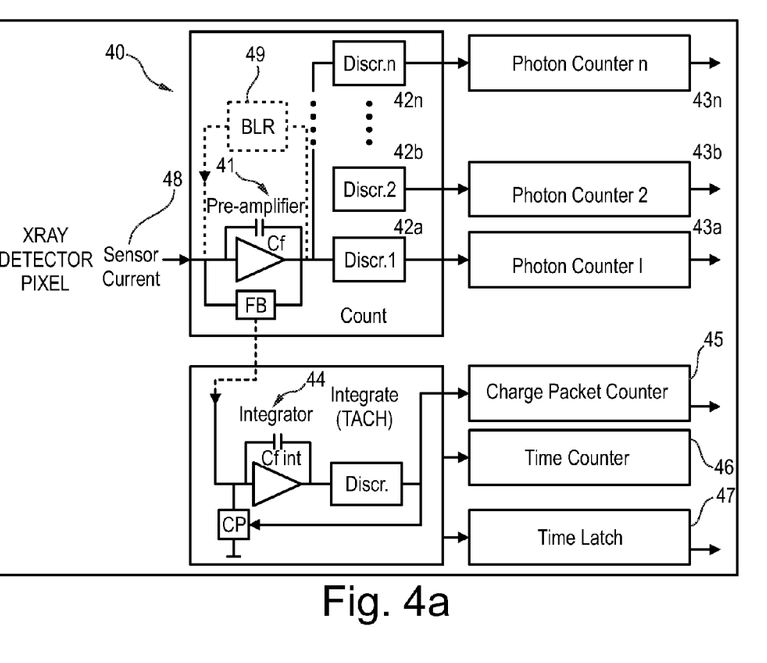
FIG. 4a,b a further exemplary embodiment of electronics circuitry for analyzing readout information.

Further, the method according to the present invention may both be embodied as a program element within processor 28 as well as dedicated electronic circuitry performing the individual functions as depicted in FIGS. 2 and 4a,b.

Now referring to FIG. 2, an exemplary embodiment of an electronics circuitry for analyzing readout information is depicted.

FIG. 2 shows exemplary readout circuitry 40 receiving as input a sensor current of an X-ray detector. In particular, FIG. 2 may be seen as readout circuitry being connected to a single X-ray detector pixel element 18.

The circuitry in FIG. 2 is divided in a first part I determining a photon count and determining the respective photon energy and a further, second part II for determining the current received from a particular detector pixel 8. A plurality of discriminators 42a,b,n are employed for determining a particular energy level of a photon arriving at the X-ray detector pixel element. Subsequently, a photon counter 43a,b,n is attached behind the respective discriminator 42a,b,n for counting arriving photons having a respective energy level.

E.g., a photon having an energy level between discriminator 1 and 2 would result in being counted by photon counter 1, thereby it is known that the energy level of the photon must be between the energy levels determined by discriminator 1 and discriminator 2. A photon having an energy level between that of discriminator 6 and discriminator 7 for example, results in all photon counters 1 to 6 registering said photon, subsequently allowing determining the energy range of said photon to be between the energy level of discriminator 6 and discriminator 7.

Parallel to the evaluation of the photon count, the current received from said pixel element is determined by an integrator 44 employing a charge packet counter 45 and a timer 46,47 to determine a charge amount during a specific time resulting in a current. Using the compensation information based on the persistent current, the energy threshold levels of the respective discriminators 42a,b,n may be compensated. Said compensation may e.g. be conducted by determining the persistent current, determining a baseline shift from the calculated persistent current and adjusting the energy thresholds of the discriminators corresponding to the baseline shift. E.g., a threshold that would be at 80 keV becomes a threshold at 64 keV in case the baseline shift amounts to 16 keV according to the estimated persistent current. Since the actual baseline shift may vary, a larger number of thresholds, e.g. n=10, or discriminators and possibly a fixed mutual energy distance is set above the baseline without baseline shift, in case there is no persistent current.

In a preferred embodiment there are still at least five threshold levels above a possibly shifted baseline resulting from the maximum estimated persistent current that may occur. In this case, it would still be possible to estimate the energy of a pulse train, resulting from a plurality of subsequent impinging photons, despite the presence of persistent current.

Preferably, the persistent current at least remains approximately constant during one measurement period, in particular very short measurement periods of e.g. 100 µs or less. Further, the readout circuitry, in particular in case it is embodied as analog front end circuitry may be designed in such a way that the dynamic range of the readout circuitry, in particular of its amplifying elements and the individual energy threshold levels determinable, is large enough to provide linear output results even at high instantaneous background currents, which possibly superimpose onto the pulse train of charge pulses forming the photo current. In other words, the analog front end should still provide output pulses of amplitude $a_0$ when on top of a persistent current, a charge pulse of $q_0$ is available at the input, irrespective of the height of the persistent current. The dynamic range should thus be such that the highest conceivable charge pulse arriving at readout circuitry currently suffering from the largest conceivable persistent current condition results in an output signal still within the dynamic range of the circuitry.

In case of a (non-linear) dependency of the photoconductive gain on the mean energy of the incident spectrum, it may further be required to characterize the photoconductive gain in dependence of the mean energy of the incident spectrum for each pixel. After correction of the baseline shift, in particular under the assumption of a certain mean energy of the incident spectrum, the photon energies are estimated and from this estimation also a mean energy. In case this determined mean energy matches the assumed mean energy, the baseline shift correction is considered to be sufficient. Otherwise, the correction is done successively with further photoconductive gain values for different mean energies until obtaining a best match.

Figure 3:
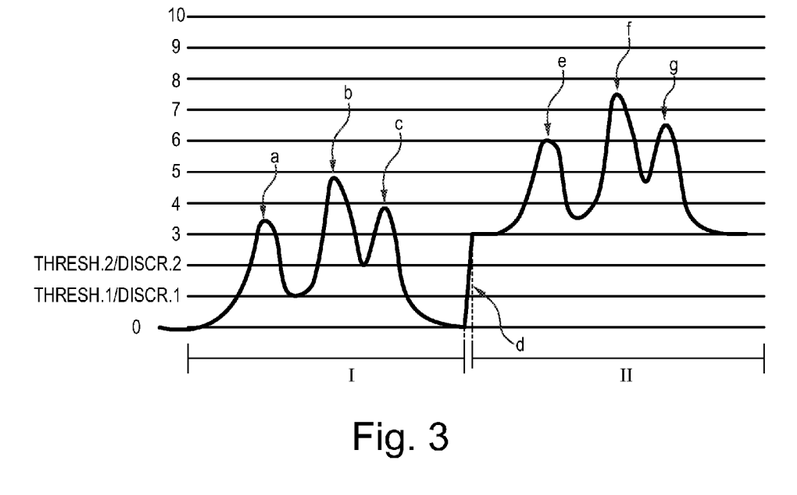
FIG. 3 an exemplary diagram for determining photon energy.

Now referring to FIG. 3, an exemplary diagram for determining photon energy is depicted.

FIG. 3 shows on the left side I of the diagram, a determination scenario without persistent current, while on the right side II, a scenario with persistent current is depicted. Each scenario I, II depicts a pulse train of three arriving photons a, b, c and e, f, g respectively, each having a dedicated energy level, which is to be determined. In particular, for the further explanations, it may be assumed, that the respective photon energies of arriving photons are the same for a and e, b and f, c and g.

The horizontal lines depict exemplarily 10 thresholds corresponding to a certain energy. Accordingly, threshold 1 corresponds to the threshold of discriminator 1 of the photon counter of FIG. 2, while threshold 2 corresponds to the level of discriminator 2 etc. Of the three arriving photons in scenario I, photon a has an energy level between threshold 3 and threshold 4, photon b has an energy level between threshold 4 and threshold 5 while photon c again has an energy level between threshold 3 and threshold 4. Accordingly, for photon a, the first three discriminators register as they do for photon c. For photon b, the first four discriminators register. The large number of thresholds are employed to accommodate an instantaneous baseline shift.

The highest threshold to set is determined by the largest possible baseline shift. Between scenario I and scenario II, a near instantaneous baseline shift d due to persistent current occurs, in particular when the X-ray flux changes instantaneously. The baseline shift d in FIG. 3 corresponds exemplarily to the energy threshold of discriminator 3.

Subsequently, photons e, f, g are registered. The energy level of photon e is registered between threshold 5 and threshold 6, photon f is registered between threshold 7 and threshold 8, while the energy of photon g is registered between threshold 6 and threshold 7. The determined energy values are substantially larger than what would have been registered without the baseline shift d, since it is assumed that the actual energy levels of photons e, f, g substantially correspond to those of photons a, b, c. Accordingly, to obtain the real energy values, the energy level of the baseline shift d, attributed to the persistent current, would have to be subtracted from the respective energy levels of photons e, f and g, i.e. the energy corresponding to threshold 3.

Accordingly, when determining the persistent current, an according baseline shift, d in FIG. 3, is determinable, which in turn can be employed for compensating the determined threshold levels in case persistent current and thus a baseline shift is present.

To compensate the energy values of photons e, f and g, the energy threshold level of threshold 3, corresponding to shift d, could be subtracted from the respective energy levels determined for photons e, f, g, in case a linear vertical scale is assumed in FIG. 3.

Now referring, to FIG. 4, a further exemplary embodiment of an electronics schematic for analyzing readout information is depicted.

The described correction scheme can also be employed in conjunction with a baseline restoration in order to avoid baseline shifts caused by slowly changing persistent current components. To realize such a baseline restorer, a baseline restorer feedback circuitry 49 is employed, comprising a feedback loop around the pre-amplifier 41 of the photon counting part I of FIG. 2. Accordingly, the feedback from the counter I to the integrator 41 and thus the integrating channel II would not perceive the slowly changing persistent current components, since said components have already been compensated by the baseline restorer.

Figure 4B:
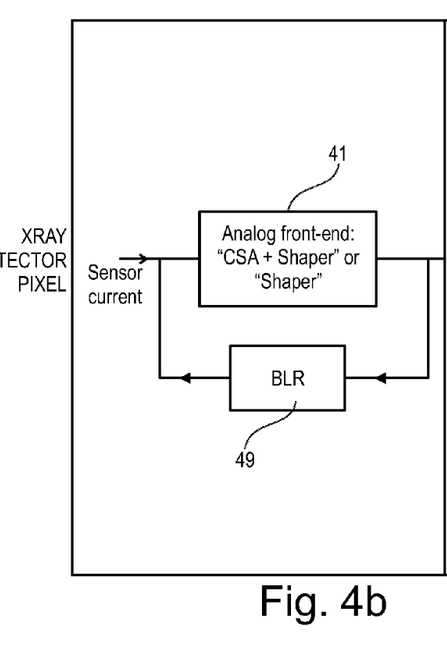

FIG. 4b shows the feedback from the output of the analog front end amplifier to the input thus adding to the sensor current arriving from the X-ray detector pixel element, thereby compensating the slowly changing persistent current. "CSA and shaper" or the "shaper" alone are adapted for generating voltage pulses from current pulses, with the height of a voltage pulse being proportional to the area or region below a certain current pulse. Such an area is a measure for the electric charge provided by the current pulse and thus is also a measure of the energy of the X-ray photon generating the respective current pulse.

The present invention can be applied to all photon counting radiation detectors based on direct conversion detector technology, e.g. in medical imaging systems, instruments for scientific purposes or airport/homeland security.

Figure 5:
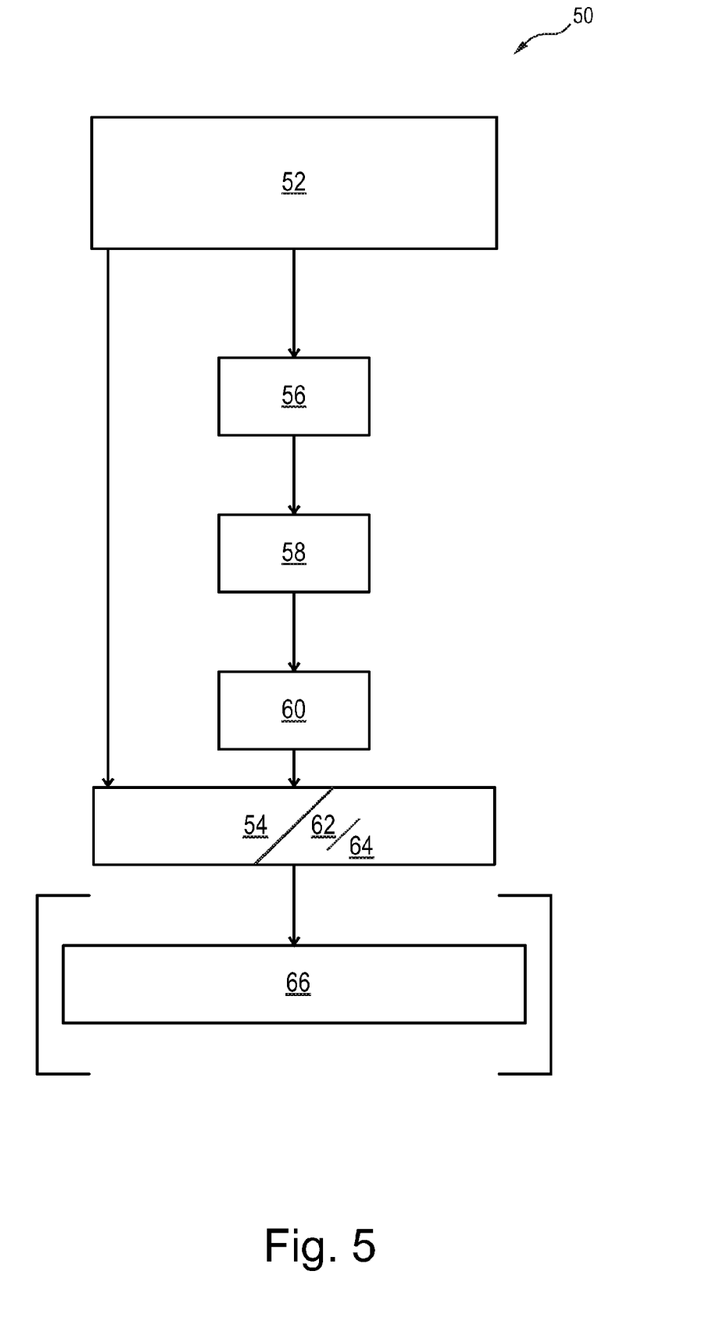
FIG. 5 an exemplary embodiment of a method for image correction of X-ray image information according to the present invention.

Now referring to FIG. 5, an exemplary embodiment of a method for image correction of X-ray image information according to the present invention is depicted.

Method 50 for image correction of X-ray image information comprises receiving 52 readout information of an X-ray detector element, wherein the readout information is dependent on impinging X-radiation generated by a photo current and compensating 54 the readout information for a photoconductive gain employing compensation information.

The compensation information may in turn be determined by determining 56 from the readout information a photon energy and/or a photon count as well as the photo current per X-ray detector pixel element, while also determining 58 a compensated photo current by compensating the photo current for persistent current. The compensation information is determined 60 by determining a compensated photon energy based on the compensated photo current.

In particular in case of a photon counter, compensating the readout information corresponds to compensating a baseline shift, which comprises determining 62 whether the photon energy exceeds a defined photon energy threshold value of a plurality of photon energy threshold values, wherein a shift in determined threshold value is introducible by the persistent current and compensating 64 the shift employing the compensation information for obtaining a compensated photon energy threshold value.

Optionally, the compensated readout information may further be compensated 66 for slowly changing persistent current by employing a baseline restoration.

LIST OF REFERENCE SIGNS

10 X-ray/CT system
12 X-ray generating device
14 X-ray detector
16 gantry
18 X-ray detector pixel element
20 X-ray radiation
22 object
24 support
26 apparatus
28 processor element
30 storage/memory element
32 display element
40 readout circuitry
41 amplifier
42a,b,n discriminator
43a,b,n photon counter
44 integrator
45 charge packet counter
46 time counter
47 time latch
48 X-ray detector pixel sensor current
49 baseline restorer
50 method for image correction
52 receiving readout information
54 compensating readout information
56 determining from the readout information photon energy/a photon count as well as the photo current per X-ray detector pixel element
58 determining a compensated photo current
60 determining the compensation information
62 determining the photon energy exceeding a defined photon energy threshold value
64 compensating threshold shift/baseline shift
66 compensating readout information for slowly changing persistent current

The invention claimed is:

1. A method for image correction of X-ray image information, comprising
   receiving readout information of an X-ray detector pixel element, wherein the readout information is dependent on X-radiation impinging on a direct conversion x-ray material volume that generates a photo current which includes persistent currents, wherein the readout information includes a determined energy of a photon according to the photo current; and
   compensating the determined energy of the photon for a baseline shift of persistent current occurring in less than one microsecond.

2. The method according to claim 1, wherein compensating the determined energy of the photon comprises using a lookup-table, which stores one or more values for the direct conversion x-ray material volume dependent upon a function of at least one of a group comprising of X-radiation flux and X-radiation mean energy.

3. The method according to claim 2, wherein the one or more values for the direct conversion x-ray material volume are determined by a calibration operation of an X-ray system that operates the X-ray system without any object in a path of the X-radiation between an X-ray generating device and the X-ray detector pixel element employing a known X-ray flux having a known mean energy.

4. The method according to claim 1, further comprising:
   compensating the determined energy of the photon for a slowly changing persistent current by employing a baseline restoration which compensates for the slowly changing persistent current before determining the energy of the photon.

5. An apparatus for image correction of X-ray image information, comprising
   a storage element for storing received readout information of an object being imaged; and a processing element for generating compensated readout information which comprises compensated energies of photons;
wherein the apparatus is adapted to carry out the method according to claim 1.

6. An X-ray system comprising an apparatus according to claim 5.

7. Use of an apparatus according to claim 5 in one of an X-ray system and a CT system.

8. A non-transitory computer-readable medium, in which a computer program for image correction of X-ray image information is stored, which computer program, when being executed by a processor, is adapted to carry out the method according to claim 1.

9. A program element for image correction of X-ray image information, which program element, when being executed by a processor, is adapted to carry out the method according to claim 1.

* * * * *